(12) United States Patent
Jabaji et al.

(10) Patent No.: US 7,944,185 B2
(45) Date of Patent: May 17, 2011

(54) POWER CONTROL SYSTEM AND METHOD

(75) Inventors: Issam Jabaji, Glenview, IL (US); Shadi Jabaji, Glenview, IL (US)

(73) Assignee: C. E. Niehoff & Co., Evanston, IL (US)

( * ) Notice: Subject to any disclaimer, the term of this patent is extended or adjusted under 35 U.S.C. 154(b) by 0 days.

(21) Appl. No.: 12/592,246

(22) Filed: Nov. 20, 2009

(65) Prior Publication Data

US 2010/0096862 A1 Apr. 22, 2010

Related U.S. Application Data

(62) Division of application No. 12/229,042, filed on Aug. 18, 2008, now Pat. No. 7,692,413, which is a division of application No. 11/234,579, filed on Sep. 23, 2005.

(51) Int. Cl.
| | |
|---|---|
| *H02P 9/00* | (2006.01) |
| *F02D 29/06* | (2006.01) |
| *H02P 9/04* | (2006.01) |
| *F02C 6/00* | (2006.01) |
| *H02K 7/18* | (2006.01) |

(52) U.S. Cl. ................ 322/45; 290/40 B; 290/52
(58) Field of Classification Search ............... 322/45; 290/40, 52 B, 40 B, 52

See application file for complete search history.

(56) References Cited

U.S. PATENT DOCUMENTS

| | | | | |
|---|---|---|---|---|
| 3,493,800 A | * | 2/1970 | Barrett ........................ | 310/168 |
| 3,568,041 A | * | 3/1971 | Arakane ...................... | 322/28 |
| 3,619,631 A | | 11/1971 | Strohmeyer, Jr. .......... | 290/40 R |
| 3,681,611 A | * | 8/1972 | Watson ....................... | 307/10.1 |
| 3,776,265 A | | 12/1973 | O'Connor, Jr. ............ | 137/487.5 |
| 3,789,229 A | | 1/1974 | Jackson ..................... | 290/40 B |
| 3,875,384 A | | 4/1975 | Davis ......................... | 700/82 |
| 4,120,274 A | * | 10/1978 | De Lancey .................. | 123/452 |
| 4,308,835 A | * | 1/1982 | Abbey ........................ | 123/439 |
| 4,314,831 A | * | 2/1982 | Barbic ....................... | 55/385.1 |

(Continued)

FOREIGN PATENT DOCUMENTS

DE 3438893 A1 4/1986

(Continued)

*Primary Examiner* — T. C. Patel
*Assistant Examiner* — Pedro J Cuevas
(74) *Attorney, Agent, or Firm* — Law Offices of Michael M. Ahmadshah

(57) ABSTRACT

A power control system comprises a prime mover and a generator driven by the prime mover. A control device is coupled with the prime mover and the generator wherein the control device ascertains a power level of the generator and varies an output power of the prime mover according to the power level. The control device measures a duty cycle of a generator output power controller to ascertain the generator power level and generates a signal to a prime mover controller so that the generator duty cycle remains within a pre-determined range. The power control system may include a transmission wherein the control device operation maybe conditioned on a state of the transmission. The power control system may include a speed converter coupled with the prime mover wherein the control device converts a speed of the prime mover according to the generator power level. The control device may operate to control an output power of the generator concurrently with controlling the output power of the prime mover.

31 Claims, 7 Drawing Sheets

U.S. PATENT DOCUMENTS

| | | | | |
|---|---|---|---|---|
| 4,450,825 A * | 5/1984 | Sekiguchi et al. | | 123/698 |
| 4,510,903 A | 4/1985 | Sakakiyama | | 290/40 B |
| 4,629,968 A | 12/1986 | Butts et al. | | 322/29 |
| 4,884,530 A * | 12/1989 | Boekhaus et al. | | 123/1 A |
| 4,998,520 A | 3/1991 | Wright | | 123/399 |
| 5,083,077 A * | 1/1992 | Wallace et al. | | 322/32 |
| 5,325,042 A * | 6/1994 | Murugan | | 322/10 |
| 5,402,007 A | 3/1995 | Center et al. | | 290/40 B |
| 5,414,792 A | 5/1995 | Shorey | | 388/811 |
| 5,481,176 A | 1/1996 | DeBiasi et al. | | 322/7 |
| 5,553,454 A | 9/1996 | Mortner | | 60/409 |
| 5,570,001 A | 10/1996 | Fenley | | 322/36 |
| 5,600,233 A * | 2/1997 | Warren et al. | | 323/237 |
| 5,712,786 A * | 1/1998 | Ueda | | 701/110 |
| 5,731,649 A * | 3/1998 | Caamano | | 310/216.047 |
| 5,814,914 A * | 9/1998 | Caamano | | 310/216.047 |
| 5,892,342 A * | 4/1999 | Friedlander et al. | | 318/434 |
| 5,903,082 A * | 5/1999 | Caamano | | 310/216.001 |
| 5,982,070 A * | 11/1999 | Caamano | | 310/216.047 |
| 5,986,378 A * | 11/1999 | Caamano | | 310/216.047 |
| 5,986,439 A | 11/1999 | Pletta et al. | | 322/59 |
| 6,028,416 A * | 2/2000 | Tallarek | | 322/59 |
| 6,049,197 A * | 4/2000 | Caamano | | 322/89 |
| 6,137,247 A * | 10/2000 | Maehara et al. | | 318/140 |
| 6,154,013 A * | 11/2000 | Caamano | | 322/89 |
| 6,247,446 B1 | 6/2001 | Fassler et al. | | 123/339.22 |
| 6,259,233 B1 * | 7/2001 | Caamano | | 322/89 |
| 6,404,007 B1 | 6/2002 | Mo et al. | | 257/324 |
| 6,407,466 B2 * | 6/2002 | Caamano | | 290/52 |
| 6,488,005 B2 | 12/2002 | Kim | | 123/339.16 |
| 6,534,958 B1 | 3/2003 | Graber et al. | | 322/11 |
| 6,836,718 B2 | 12/2004 | Hasfjord et al. | | 701/54 |
| 7,486,053 B2 * | 2/2009 | Qi et al. | | 322/47 |
| 7,592,784 B2 * | 9/2009 | Qi et al. | | 322/24 |
| 7,635,922 B2 * | 12/2009 | Becker | | 290/40 C |
| 7,671,571 B2 * | 3/2010 | Burlak et al. | | 323/275 |
| 7,692,413 B2 * | 4/2010 | Jabaji et al. | | 322/45 |
| 7,723,970 B1 * | 5/2010 | Fernald | | 323/282 |
| 7,737,582 B2 * | 6/2010 | Jabaji et al. | | 307/126 |
| 7,750,489 B2 * | 7/2010 | Becker | | 290/40 C |
| 7,804,181 B2 * | 9/2010 | Becker | | 290/40 C |
| 7,804,279 B2 * | 9/2010 | Becker | | 322/29 |
| 7,808,119 B2 * | 10/2010 | Becker | | 290/40 B |
| 7,812,469 B2 * | 10/2010 | Asada | | 290/40 B |
| 7,812,574 B2 * | 10/2010 | Becker | | 322/29 |
| 7,825,530 B2 * | 11/2010 | Schulte et al. | | 290/40 B |
| 2001/0024075 A1 * | 9/2001 | Caamano | | 310/254 |
| 2002/0091035 A1 * | 7/2002 | Monowa et al. | | 477/143 |
| 2003/0106531 A1 * | 6/2003 | Saeki et al. | | 123/435 |
| 2003/0224906 A1 * | 12/2003 | Monowa et al. | | 477/121 |
| 2006/0061335 A1 * | 3/2006 | Inokuchi et al. | | 322/37 |
| 2006/0284604 A1 * | 12/2006 | Qi et al. | | 322/7 |
| 2007/0013361 A1 * | 1/2007 | Burlak et al. | | 324/142 |
| 2007/0069521 A1 * | 3/2007 | Jabaji et al. | | 290/40 C |
| 2007/0228735 A1 * | 10/2007 | Becker | | 290/40 C |
| 2008/0284404 A1 * | 11/2008 | Burlak et al. | | 323/312 |
| 2009/0045783 A1 * | 2/2009 | Qi et al. | | 322/37 |
| 2009/0121496 A1 * | 5/2009 | Jabaji et al. | | 290/40 B |
| 2009/0206601 A1 * | 8/2009 | Becker | | 290/7 |
| 2009/0212561 A1 * | 8/2009 | Becker | | 290/7 |
| 2009/0212747 A1 * | 8/2009 | Becker | | 322/29 |
| 2009/0224540 A1 * | 9/2009 | Becker | | 290/7 |
| 2009/0230680 A1 * | 9/2009 | Becker | | 290/7 |
| 2009/0234509 A1 * | 9/2009 | Becker | | 700/287 |
| 2010/0038907 A1 * | 2/2010 | Hunt et al. | | 290/7 |
| 2010/0090478 A1 * | 4/2010 | Jabaji et al. | | 290/40 B |
| 2010/0138071 A1 * | 6/2010 | Becker et al. | | 700/297 |
| 2010/0176851 A1 * | 7/2010 | Jiang et al. | | 327/115 |
| 2010/0213914 A1 * | 8/2010 | Fernald | | 323/288 |
| 2010/0283252 A1 * | 11/2010 | Fradella | | 290/55 |

FOREIGN PATENT DOCUMENTS

| | | | |
|---|---|---|---|
| EP | 0643474 A1 | 3/1993 | |

* cited by examiner

POWER CONTROL SYSTEM AND METHOD

CROSS REFERENCE TO RELATED APPLICATIONS

The present patent application is a division of a non-provisional patent application entitled "Power Control System and Method," filed Aug. 18, 2008, as U.S. patent application Ser. No. 12/229,042, now U.S. Pat. No. 7,692,413 which in turn is a divisional of a non-provisional patent application entitled "Power Control System and Method," filed Sep. 23, 2005, as U.S. patent application Ser. No. 11/234,579, by the same inventors. This patent application claims the benefit of the filing date of the cited non-provisional patent applications according to the statutes and rules governing non-provisional patent applications, particularly 35 USC §§120, 121, and 37 CFR §1.78. The specification and drawings of the cited non-provisional patent applications are specifically incorporated herein by reference.

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

This invention is related to power control systems comprising a prime mover, such as an internal combustion engine, and a generator driven by the prime mover. In particular, this invention relates to a control device, including a system and method, which controls the output power of the prime mover according to a power level of the generator by determining a duty cycle of the generator's output power controller and varying the output power of the prime mover according to said power level.

BACKGROUND

The present invention relates to power control systems which comprise a prime mover and a generator driven by the prime mover. For instance, in a vehicle, an internal combustion engine provides mechanical power to propel the vehicle, and to drive engine accessories, such as generators, air conditioning units, compressors, cooling fans, and pumps, to name a few examples. In a generator set, an internal combustion engine drives a generator to convert the engine's mechanical power into electrical power. The present invention specifically focuses on a control device that controls the engine output power in order to enhance the performance of both the engine and generator. In particular, the control device is configured to ascertain a power level of the generator and to vary the output power of the engine so that the generator power level is maintained within a pre-determined range.

Electro-mechanical power conversion systems, such as those mentioned above, are normally comprised of an internal combustion engine and a generator. The engine supplies the generator with mechanical power where it is converted to electrical power. In a vehicle, for instance, the generator generates electrical power for the vehicle electrical system when the vehicle's engine is operating. In a generator set, the engine's mechanical power is converted to electrical power by the generator which is available via power output connectors. As electrical loads are added and removed from the generator, the engine experiences the corresponding variation in mechanical loads. In the case of the vehicle, during idle periods, such variations in mechanical loads on the engine cause the engine's rotational speed, commonly referred to as the RPM (revolution per minute) to vary accordingly. In the case of the generator set, similar changes in the RPM occur as electrical loads are connected and disconnected with the power output connectors.

Generator output power is typically a function of the generator shaft speed and it can be characterized by two distinct regions throughout the engine RPM range. In the first region, where the engine RPM ranges from 0 to approximately the idle RPM, the generator output power rate of change varies substantially with respect to the RPM. In the second region, where the engine RPM ranges from approximately the idle RPM to maximum RPM, the generator output power rate of change varies much less. Power conversion systems, such as those mentioned above, are devised taking these two regions into consideration. In the vehicle, the generator is selected based on the output power it can generate at idle RPM. In the generator set, the engine RPM is preset at a position where the engine produces its maximum output power and the generator is designed to produce its optimum power output at that RPM. As will be discussed below, such power conversion systems, without proper control of the engine in response to generator electrical output, may be detrimental to the system electrical components, are fuel inefficient, and may produce excessive noise.

A vehicle's engine RPM, at idle condition, varies as electrical loads are applied to and removed from the generator. The generator's output power is especially susceptible to such variations in the low RPM region. Even a small change in the engine RPM, for instance a 10% change, may produce a substantial variation in the generator output power, for instance a 30% change. Of particular concern is when the engine idle RPM is at a point where the generator can not produce enough power to meet the electrical demand.

When the electrical power demand surpasses the generator capacity at the operating RPM, the generator voltage decreases and supplemental energy is supplied by the vehicle battery to satisfy the electrical demand. This condition may be detrimental to the vehicle electrical system as the depleting battery energy causes a continuing decline in the system voltage.

In most applications, substantial electrical power demand on the vehicle electrical system occurs when the vehicle engine is at idle. As discussed above, increasing the electrical loads at engine idle RPM will cause the generator to reach a point where it can no longer sustain the system voltage even though the generator electrical output is below its rating. This is because the generator published rating applies to a much higher generator shaft speed. As this condition continues, the battery discharges and it will eventually reach a point of discharge detrimental to the battery life. Other electrical devices included in the vehicle electrical system may also malfunction when the system voltage falls below a certain threshold. For instance, most semiconductor-based electronic devices are designed to be deactivated when a low system voltage is detected.

In some other applications, a remote switch is provided to manually control the engine idle RPM. When the vehicle operator notices a drop in the system voltage, he may set a throttle cable or activate a switch which causes the engine RPM to increase in a discrete step. This in turn causes the generator RPM to increase, thus maintaining the system voltage. This higher RPM setting is commonly referred to as the high idle RPM. However, as the electrical loads are removed, the high idle RPM is no longer required to maintain the system voltage. Furthermore, the operator is typically not notified of this condition and the consequences are inefficient fuel consumption at high engine idle and low electrical load.

In a generator set, the power conversion system is designed such that the engine RPM is preset at a position that enables the generator to produce its maximum power. However, there are periods when the applied electrical loads do not require the engine to operate at this governed RPM. This condition gives rise to higher than needed fuel consumption. Furthermore, audible noise associated with the engine and/or the generator increase substantially with increasing RPM.

Although various systems have been proposed which touch upon some aspects of the above problems, they do not provide solutions to the existing limitations in power control systems. A common theme of these various systems is that the idle speed of an engine, driving an alternator, is manipulated in response to variations of battery voltage, system electrical loads and mechanical loads on the engine by the generator.

For example, the Fenley patent, U.S. Pat. No. 5,570,001, discloses an apparatus that includes an engine driving an alternator where the engine speed is automatically controlled by manipulating the throttle according to the charging current of the alternator. The apparatus is further capable of unloading the alternator from the engine when excessive electrical loads are engaged, in order to prevent the engine from stalling. However, this apparatus does not recognize an idle condition of the engine and therefore it cannot be used in a motor vehicle that is propelled via a transmission. Furthermore, the throttle control of this apparatus is based on charging current of the alternator while the present invention controls the throttle according to a power level of the alternator which includes voltage, current, and duty cycle.

In DeBiasi et al., U.S. Pat. No. 5,481,176, the disclosure describes a charging system including an engine driving an alternator and a voltage regulator, where the voltage regulator voltage set-point is modified by an engine controller device according to (1) near-wide-open-throttle, (2) application of vehicle brakes, and (3) increased torque of the alternator, or any combination thereof. When condition (3) is met, the engine controller manipulates the engine idle speed to keep it relatively constant as the applied electrical loads cause the alternator's torque on the engine to increase. However, this charging system reduces the voltage regulator voltage set-point when electrical loads are applied, causing the system voltage to go down and subsequently ramps up the voltage set-point to its initial setting while adjusting the throttle, so that the idle speed remains relatively unaffected by increased electrical loads. The present invention manipulates the throttle to maintain both the idle speed and system voltage constant in light of increased or decreased electrical loads.

Center et al., U.S. Pat. No. 5,402,007, discloses an apparatus including an engine driving an alternator, where the system voltage set-point is determined during off-idle operation ("off-idle voltage") and compared with a voltage measured during idle operation ("idle voltage"). The throttle is then manipulated such that the measured voltage is equal to the system voltage set-point. However, this apparatus requires the system voltage set-point to be determined separately while the present invention is pre-programmed with the system voltage set-point. Furthermore, the throttle is manipulated based on the difference between the off-idle voltage and idle voltage, while the present invention controls the throttle based on the alternator power level which includes voltage, current, and duty cycle.

Power conversion systems, such as those incorporated in a vehicle or a generator set, utilize a prime mover and a generator. An important aspect of the control of such power conversion systems is monitoring the output power of the prime mover and the power level of the generator. Only then can proper operation of the electrical and/or mechanical components, efficient fuel consumption, and audible noise reduction be assured. Considering these issues, a control device is needed to monitor the engine and the generator, and to vary the engine output power based on the power level of the generator.

SUMMARY

The present invention discloses a control device, including a system and method, which can be utilized in a power conversion system to ensure efficient power conversion and improved operation. The power conversion system includes a prime mover, such as an internal combustion engine, and a generator, such as an alternator, that is driven by the prime mover. The control device is coupled with the prime mover and generator, and it ascertains a power level of the generator and varies an output power of the prime mover according to the power level. Preferably, the control device is coupled with the prime mover via a prime mover controller, capable of manipulating an output power of the prime mover, and the generator via a generator output power controller. The control device is configured to measure a duty cycle of the generator output power controller and to generate a signal to the prime mover controller according to the duty cycle. The prime mover controller may include a pressure controller, a fuel volume controller, a rotational speed controller, or a programmable device, any one of which is capable of varying the output power of the prime mover in proportion to the power level of the generator. The control device may be further configured to regulate the output voltage of the generator via the generator output power controller. The power control system may include a transmission which may be coupled with the control device and wherein the prime mover controller is engaged by the control device when the transmission is in a state of neutral or parked condition. The control device may be further configured to disengage the prime mover controller when the power level is below a pre-determined level. The power control system may include a speed converter coupled with the prime mover and capable of converting a speed of the prime mover and wherein the control device is configured to convert the speed of the prime mover according to the power level of the generator. The control device may be further configured to communicate system information to a computer system.

In one aspect, a power control system is disclosed comprising a prime mover, a generator, and a control device connected to and in communication with the prime mover and generator. The control device is configured to ascertain a power level of the generator and to vary an output power of the prime mover according to said power level. Preferably, the generator comprises a generator output power controller coupled with the control device and wherein the control device ascertains a power level of the generator via said controller. Preferably, the prime mover comprises a prime mover controller coupled with the control device and capable of manipulating the output power of the prime mover in response to the power level as determined by the control device. In one instance, the prime mover comprises an internal combustion engine whose output power can be varied by a throttle controller. In another instance, the prime mover's output power can be varied by varying a rotational speed of the prime mover via a rotational speed controller. In yet another instance, the prime mover controller is a fuel volume controller capable of varying the prime mover's output power. In yet another instance, the prime mover controller is an electronic engine controller capable of varying the prime mover's output power.

In another aspect, a power control system is disclosed comprising a prime mover, a generator, and a control device connected to and in communication with the prime mover and generator. The control device is configured to ascertain a power level of the generator and to vary an output power of the prime mover according to said power level. Preferably, the control device further comprises a voltage regulator capable of regulating the output voltage of the generator at a regulation voltage. In one instance, the control device comprises a temperature sensor that measures a temperature and wherein the voltage regulator varies the regulation voltage according to the temperature.

In another aspect, a power control system is disclosed comprising a prime mover, a generator, and a control device connected to and in communication with the prime mover and generator. The control device is configured to ascertain a power level of the generator and to vary an output power of the prime mover according to said power level. Preferably, the power control system further comprises a transmission connected to and in communication with the control device. In one instance, the control device is coupled with the prime mover controller via a sense line and engages the prime mover controller when the transmission is in a neutral or parked condition. In one instance, the control device is further configured to disengage the prime mover controller when the power level is below a pre-determined level.

In another aspect, a power control system is disclosed comprising a prime mover, a generator, and a control device connected to and in communication with the prime mover and generator. The control device is configured to ascertain a power level of the generator and to vary an output power of the prime mover according to said power level. Preferably, the power control system further includes communication means in order to provide system information. Preferably, the control device comprises visual indicators, such as light emitting diodes (LEDs) which generate flashing light patterns indicative of said system information. The control device may further incorporate a communication port where the system information is communicated to a computer system.

In another aspect, a power control system is disclosed comprising a prime mover, a generator, and a control device connected to and in communication with the prime mover and generator. The control device is configured to ascertain a power level of the generator and to convert a speed of the prime mover according to said power level. Preferably, the power control system comprises a speed converter coupled with the prime mover and generator and capable of converting the speed of the prime mover. In one instance, the speed converter comprises a power train connected to and in communication with the control device and wherein the control device engages a gear of the power train in response to the power level as determined by the control device.

In another aspect, a power control system is disclosed comprising a prime mover, a generator, and a control device connected to and in communication with the prime mover and generator. The control device is configured to ascertain a power level of the generator and to vary an output power of the prime mover according to said power level. Preferably, the control device comprises a processor coupled with the generator output power controller and the prime mover controller wherein the processor measures a duty cycle of the generator output power controller, via a first line, and varies the output power of the prime mover by generating a signal to the prime mover controller, via a second line, according to the duty cycle. In one instance, the generator output power controller comprises a field coil, wherein the processor determines the duty cycle by sensing a voltage level of the field coil via the first line. In another instance, the generator output power controller comprises a semiconductor device, wherein the processor senses a voltage level of said device via the first line to determine the duty cycle. In yet another instance, the generator output power controller may include a silicon controlled rectifier, wherein the processor determines the duty cycle from a voltage level of the rectifier, as sensed via the first line. Preferably, the processor is configured to vary the output power of the prime mover by generating a signal, via the second line, so that the duty cycle is maintained within a pre-determined range.

In another aspect, a power control system is disclosed comprising a prime mover, a generator, and a control device connected to and in communication with the prime mover and generator. The control device is configured to ascertain a power level of the generator and to vary an output power of the prime mover according to said power level. Preferably, the control device comprises a processor coupled with the generator output power controller and the prime mover controller wherein the processor measures a duty cycle of the generator output power controller, via a first line, and varies the output power of the prime mover by generating a signal to the prime mover controller, via a second line, according to the duty cycle. Preferably the processor is further configured to measure an output voltage of the generator, via a third line, and to vary the duty cycle of the generator output power controller, via the first line, so that the output voltage is maintained at a regulation voltage.

In one aspect, a method is disclosed for controlling a power control system comprising a prime mover, a generator coupled with the prime mover, and a prime mover controller capable of manipulating an output power of the prime mover. The method comprises ascertaining a power level of the generator and varying the output power of the prime mover, via the prime mover controller, according to the power level. Preferably, the method comprises varying the output power of the prime mover by varying a pressure of the prime mover in proportion to the power level.

In another aspect, a method is disclosed for controlling a power control system comprising a prime mover, a generator coupled with the prime mover, and a prime mover controller capable of manipulating an output power of the prime mover. The method comprises ascertaining a power level of the generator and varying the output power of the prime mover, via the prime mover controller, according to the power level. Preferably, the method comprises varying the output power of the prime mover by varying a fuel volume of the prime mover in proportion to the power level.

In another aspect, a method is disclosed for controlling a power control system comprising a prime mover, a generator coupled with the prime mover, and a prime mover controller capable of manipulating an output power of the prime mover. The method comprises ascertaining a power level of the generator and varying the output power of the prime mover, via the prime mover controller, according to the power level. Preferably, the method comprises varying the output power of the prime mover by varying a rotational speed of the prime mover in proportion to the power level.

In another aspect, a method is disclosed for controlling a power control system comprising a prime mover, a generator coupled with the prime mover, and a prime mover controller capable of manipulating an output power of the prime mover. The method comprises ascertaining a power level of the generator and varying the output power of the prime mover, via the prime mover controller, according to the power level. Preferably, the method further comprises maintaining an output voltage of the generator, via a voltage regulator, at a regulation voltage. Preferably, the method further comprises measuring a temperature, via a sensor, and varying the regulation voltage according to the temperature.

In another aspect, a method is disclosed for controlling a power control system comprising a prime mover, a speed converter coupled with the prime mover and capable of converting a speed of the prime mover, and a generator coupled with the speed converter. The method comprises ascertaining a power level of the generator and converting the speed of the prime mover, via the speed converter, according to the power level. Preferably, the method comprises converting the speed of the prime mover by engaging a gear of the speed converter.

In another aspect, a method is disclosed for controlling a generator coupled with a prime mover, wherein the generator comprises a generator output power controller and the prime mover comprises a prime mover controller. The method comprises measuring a duty cycle of the generator output power controller, via a first line, and varying the output power of the prime mover, by generating a signal to the prime mover controller, via a second line, according to the duty cycle. Preferably, the method comprises varying the output power of the prime mover so that the duty cycle is maintained within a pre-determined range.

In another aspect, a method is disclosed for controlling a generator comprising a generator output power controller and coupled with a prime mover via a speed converter capable of converting a speed of the prime mover. The method comprises measuring a duty cycle of the generator output power controller, via a first line, and converting the speed of the prime mover, by generating a signal to the speed converter, via a second line, according to the duty cycle. Preferably, the method comprises converting the speed of the prime mover by engaging a gear of the speed converter.

The following claims define the present invention. The foregoing explanations, descriptions, illustrations, examples, and discussions regarding this invention have been set forth to demonstrate the utility and novelty of this invention and are by no means restrictive of its scope.

DETAILED DESCRIPTION OF THE PRESENTLY PREFERRED EMBODIMENTS

Figure 1:
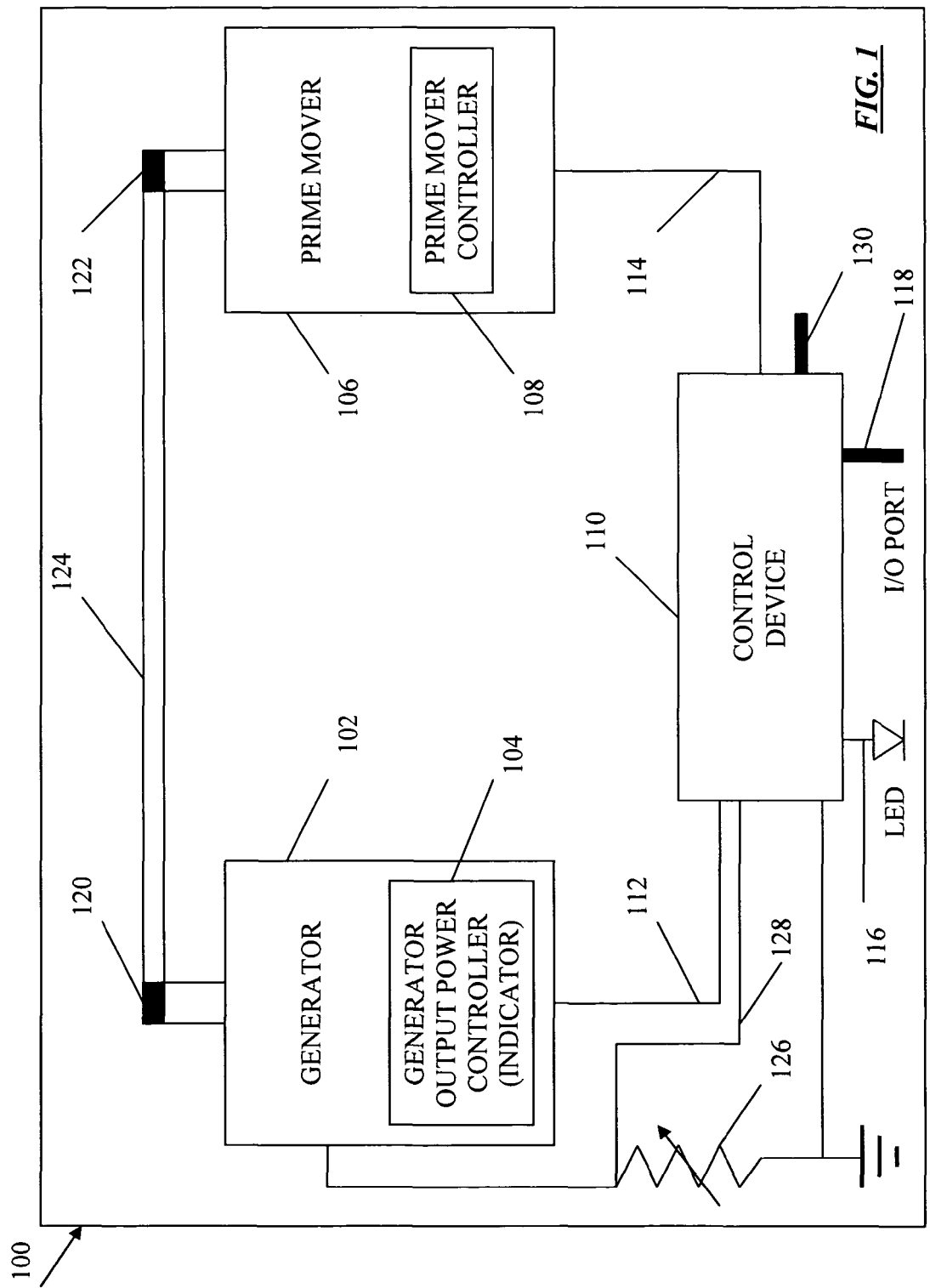
FIG. 1 shows a block diagram of a power control system according to a preferred embodiment.

FIG. 1 depicts a block diagram of a preferred embodiment of a power control system 100, including a prime mover 106, a generator 102, and a control device 110. The control device 110 is connected to and in communication with the prime mover 106 and generator 102 via a prime mover controller 108 and a generator output power controller 104, respectively. The control device 110 ascertains a power level of the generator by measuring a duty cycle of the generator output power controller 104 via a line 112. The control device 110 varies an output power of the prime mover 106 by generating a signal to the prime mover controller 108 via a line 114. It should be clear to a skilled artisan that the term signal, as used throughout this specification including the drawings, refers to both analog and digital signal whether transmitted through wire or wireless. The control device 110 is powered by the output of the generator 102 via a line 128. The generator 102 is coupled with and driven by the prime mover 106 via a coupling mechanism 124 that imparts a rotational speed of a shaft 122 of the prime mover 106 on a shaft 120 of the generator 102. The generator 102 converts mechanical power of the prime mover 106 into electrical power which is available to a variable electrical load 126. The variable electrical load 126 represents electrical loads by electrical components which may comprise a battery, a heating element, an air conditioning unit, a compressor, a cooling fan, or a pump, to name a few examples. As these electrical loads are applied and removed from the generator 102, the prime mover 106 experiences the corresponding mechanical loads which cause the rotational speed of the prime mover 106 to vary, accordingly. The control device 110 is further capable of maintaining an output voltage of the generator 102 at a regulation voltage, via the line 112, by sensing the output voltage of the generator 102, via the line 128. The control device 110 further comprises a sensor 130 capable of measuring a temperature wherein the control device 110 may vary the regulation voltage according to the temperature. The control device 110 further comprises a light emitting diodes (LED) 116 and an I/O port 118 to communicate system information.

In one embodiment, the prime mover 106 is an internal combustion engine, the generator 102 is an alternator, and the coupling mechanism 124 is a drive belt. The internal combustion engine drives the alternator via the drive belt. The generator output power controller 104 is a field coil and the prime mover controller 108 is an electrical actuator coupled with a throttle via a mechanical cable. The line 112 is connected to the field coil and operative to sense a voltage proportional to the voltage across the field coil and the line 114 is connected to the electrical actuator and operative to manipulate the mechanical cable thereby varying the position of the throttle plate. In this embodiment, the control device 110 measures a duty cycle of the voltage variation across the field coil via the line 112 and generates a signal to the electrical actuator via the line 114 to vary the output power of the internal combustion engine so that the duty cycle remains within a pre-determined range, for example between 40% and 100%. The duty cycle is not limited to any specific range and may be selected according to the application.

It should be clear to a skilled artisan that the generator output power controller 104 can be a passive or an active component. This means that in the present embodiment, the generator output power controller 104 (the field coil) is a passive component, to the extent that the output power of the generator 102 is controlled by a voltage regulator (not shown) via the field coil. In another embodiment, the generator output power controller 104 may simply be a generator output power indicator, such as a terminal capable of providing a signal indicative of the generator output power, a passive component having no function in controlling the generator output power. In another embodiment, the generator output power controller 104 is an active component, to the extent that it actively controls the generator output power. A voltage regulator (not shown) capable of providing a signal indicative of the field coil duty cycle can be utilized. Therefore, it should be clear that the control device 110 requires only a signal indicative of a power level of the generator 102 in order to vary the output power of the prime mover 106 so that the duty cycle remains within a pre-determined range.

It is contemplated that in other embodiments, the generator 102, the prime mover 106, and the control device 110 are each equipped with a wireless transmitter/receiver (not shown but known to skilled artisans) that can replace the line 112 and line 114, wherein the generator 102 transmits the duty cycle of the generator output power controller 104 which the control device 110 receives and wherein the control device 110 transmits a signal which the prime mover controller 108 receives to vary the output power of the prime mover 106.

In one embodiment, the control device 110 comprises a voltage regulator (discussed below) that maintains the output voltage of the generator 102 at a regulation voltage, for instance 28 Volts. The control device 110 achieves this by sensing the output voltage of the generator 102 by measuring a voltage of the line 128 and switching on/off the field coil via the line 112 to maintain the output voltage substantially at the regulation voltage. The control device 110 concurrently generates a signal, via the line 114, to the prime mover controller 108 to vary the output power of the prime mover 106 to maintain the duty cycle within a pre-determined range. In another variation of the present embodiment, the sensor 130 is utilized to measure a temperature, for example the temperature of a battery (not shown), and vary the regulation voltage according to the temperature.

According to another embodiment, the generator 102 is a permanent magnet alternator, the prime mover 106 is a pneumatic or fluid powered engine, and the coupling mechanism 124 is a direct drive coupling. In one configuration, the alternator shaft 120 is mated with a drive coupling of shaft 122. The generator output power controller 104 is a silicon controlled rectifier (SCR) and the prime mover controller 108 is a pressure controller. The control device 110 senses a duty cycle of the SCR via the line 112 and generates a signal proportional to the duty cycle, via the line 114, operative to change the pressure of the fluid flow through the engine thereby varying the output power of the engine. Pressure controllers of this type may include one of a compressor, a hydraulic pump, a pneumatic pump, and an electric pump.

It should be clear to a skilled artisan that the generator output power controller 104 can be a passive or an active component. This means that in the present embodiment, the generator output power controller 104 (the SCR) is a passive component, to the extent that the output power of the generator 102 is controlled by a voltage regulator (not shown) via the SCR. In another embodiment, the generator output power controller 104 may simply be a generator output power indicator, such as a terminal capable of providing a signal indicative of the generator output power, a passive component having no function in controlling the generator output power. In another embodiment, the generator output power controller 104 is an active component, to the extent that it actively controls the generator output power. A voltage regulator (not shown) capable of providing a signal indicative of the field coil duty cycle can be utilized. Therefore, it should be clear that the control device 110 requires only a signal indicative of a power level of the generator 102 in order to vary the output power of the prime mover 106 so that the duty cycle remains within a pre-determined range.

Figure 2:
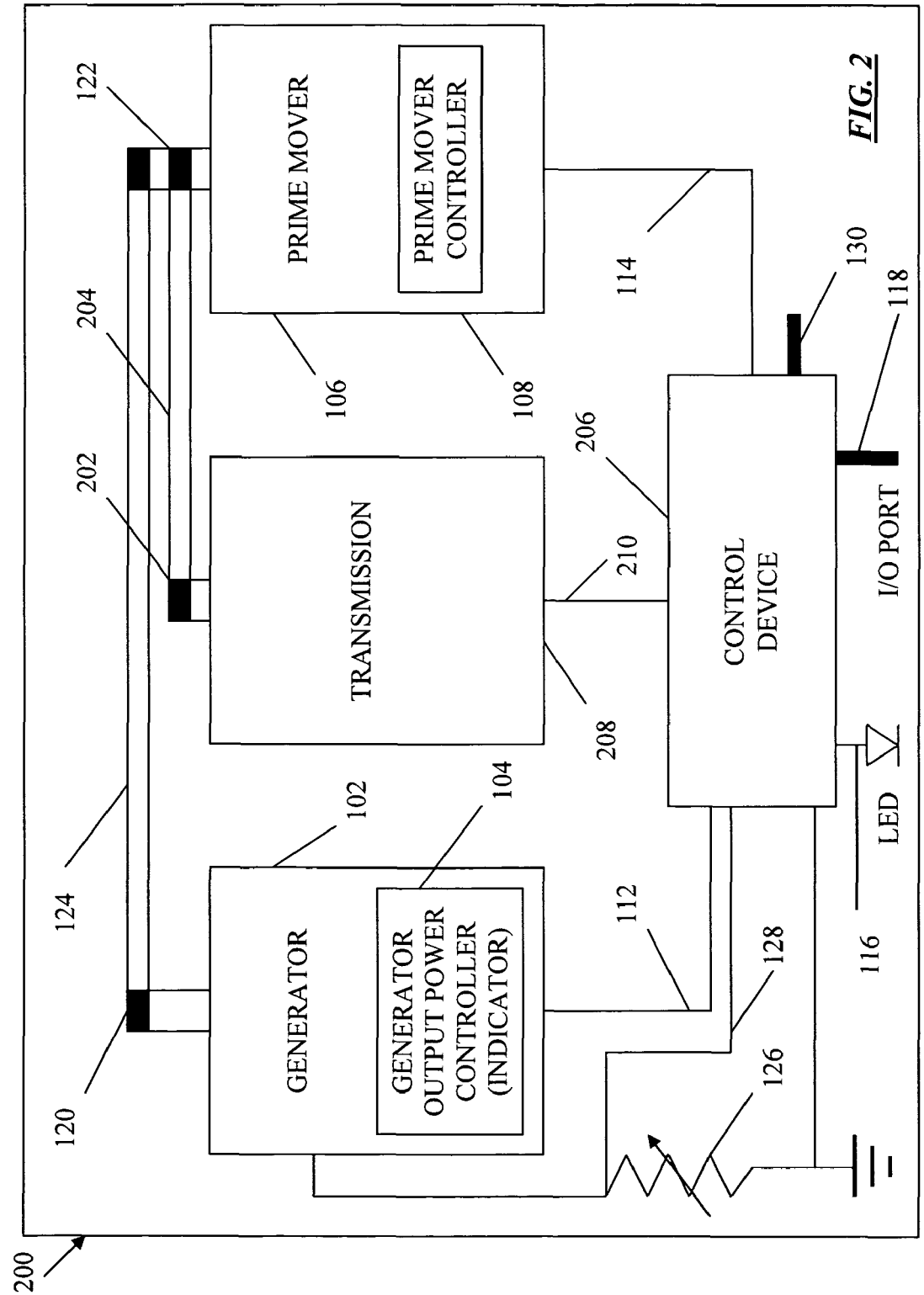
FIG. 2 shows a block diagram of a power control system according to a preferred embodiment.

FIG. 2 depicts a block diagram of a preferred embodiment of a power control system 200, including the prime mover 106, generator 102, a control device 206, and a transmission 208. This configuration is well adapted for applications in motor vehicles, where the prime mover 106 is an internal combustion engine and the transmission 208 is coupled to the engine via a coupling mechanism 204 and utilized to propel the vehicle. In this embodiment, the generator 102 is coupled with the engine via a coupling mechanism 124. The control device 206 is connected to and in communication with the generator 102 and prime mover 106 in a similar manner as shown in FIG. 1, and comprises an additional connection to the transmission 208 via a line 210. The control device 206 is configured to engage the prime mover controller 108 when a signal on the line 210 is indicative of a neutral or parked state of the transmission 208. According to this embodiment, the output power of the engine is controlled by the vehicle operator via a manual mechanism such as a foot pedal, and the engine output power control is reverted to the control device 206 only when the transmission 208 is disengaged. In a variation of the present embodiment, the output power of the prime mover 106 may be controlled concurrently by both the vehicle operator and the control device 206 when the transmission 208 is in neutral or parked condition. In another variation of the present embodiment, the signal on the line 210 may indicate to the control device 206 not to lower the output power below a threshold output power. In yet another variation of the present embodiment, the control device 206 is configured to disengage the prime mover controller 108 when said power level of the generator 102 is below a pre-determined level.

For instance, in a vehicle application, the transmission 208 is engaged by the vehicle operator to propel the vehicle. During the period when the transmission 208 is so engaged, the control device 206 is signaled, via the line 210, to disengage the prime mover controller 108. When the vehicle operator sets the transmission 208 to either a neutral or parked state, the control device 206 senses this condition via the line 210 and commences to vary the output power of the engine according to the measured duty cycle of the generator 102. It should be clear to a skilled artisan that the control device 206 may sense a condition other than a neutral or parked state in order to vary the output power of the engine.

Figure 3:
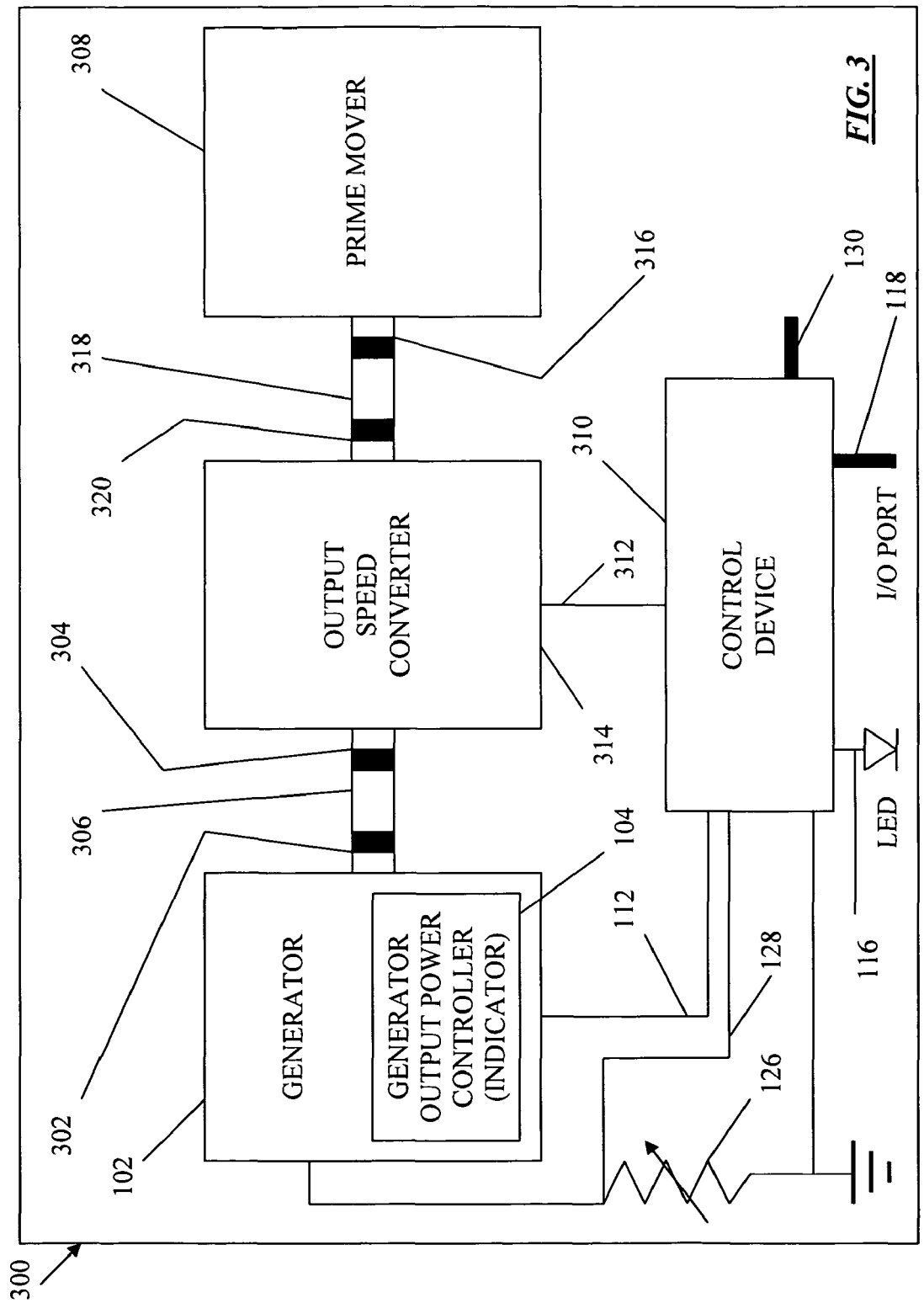
FIG. 3 shows a block diagram of a power control system according to a preferred embodiment.

FIG. 3 depicts a block diagram of a preferred embodiment of a power control system 300, including a prime mover 308, generator 102, control device 310, and output speed converter 314. The control device 310 is connected to and in communication with the generator 102 and output speed converter 314 via a first line 112 and second line 312. The output speed converter 314 is coupled with the prime mover 308, via a coupling mechanism 318, and the generator 102, via a coupling mechanism 306. As electrical loads, represented by the variable load 126, are connected and removed from the generator 102, a speed of the output speed converter 314 is reduced and increased accordingly. The control device 310 is configured to measure a duty cycle of the generator output power controller 104 (or a generator output power indicator as discussed above) of the generator 102, via the first line 112 and generate a signal to the output speed converter 314 via the second line 312 so that the duty cycle remains within a predetermined range.

An example of the present embodiment is where the prime mover 308 is a turbine engine and the output speed converter 314 is a power train that converts a rotational speed of an output shaft 316 of the turbine engine by engaging a different gear of the power train. An input shaft 320 of the output speed converter 314 is coupled with the output shaft 316 of the turbine engine via the coupling mechanism 318, for instance a direct drive coupling of the type discussed above, and rotates at the same speed as the turbine engine output shaft 316. An output shaft 304 of the output speed converter 314 is coupled with a shaft 302 of the generator 102 via the coupling 306 which may be a direct drive coupling of the type discussed above. As the variable load 126 changes, the control device 310 measures a duty cycle of the generator output power controller (or a generator output power indicator as discussed above), via the first line 112, and generates a signal, via the second line 312, to engage different gears of the power train, so that the duty cycle is maintained within a pre-determined range. In a variation of the present embodiment, the output speed converter 314 comprises a continuously variable transmission (CVT) and the control device 310 generates a signal via the second line 312 to continuously vary the rotational speed of the output shaft 304 of the CVT according to the measured duty cycle.

Figure 4:
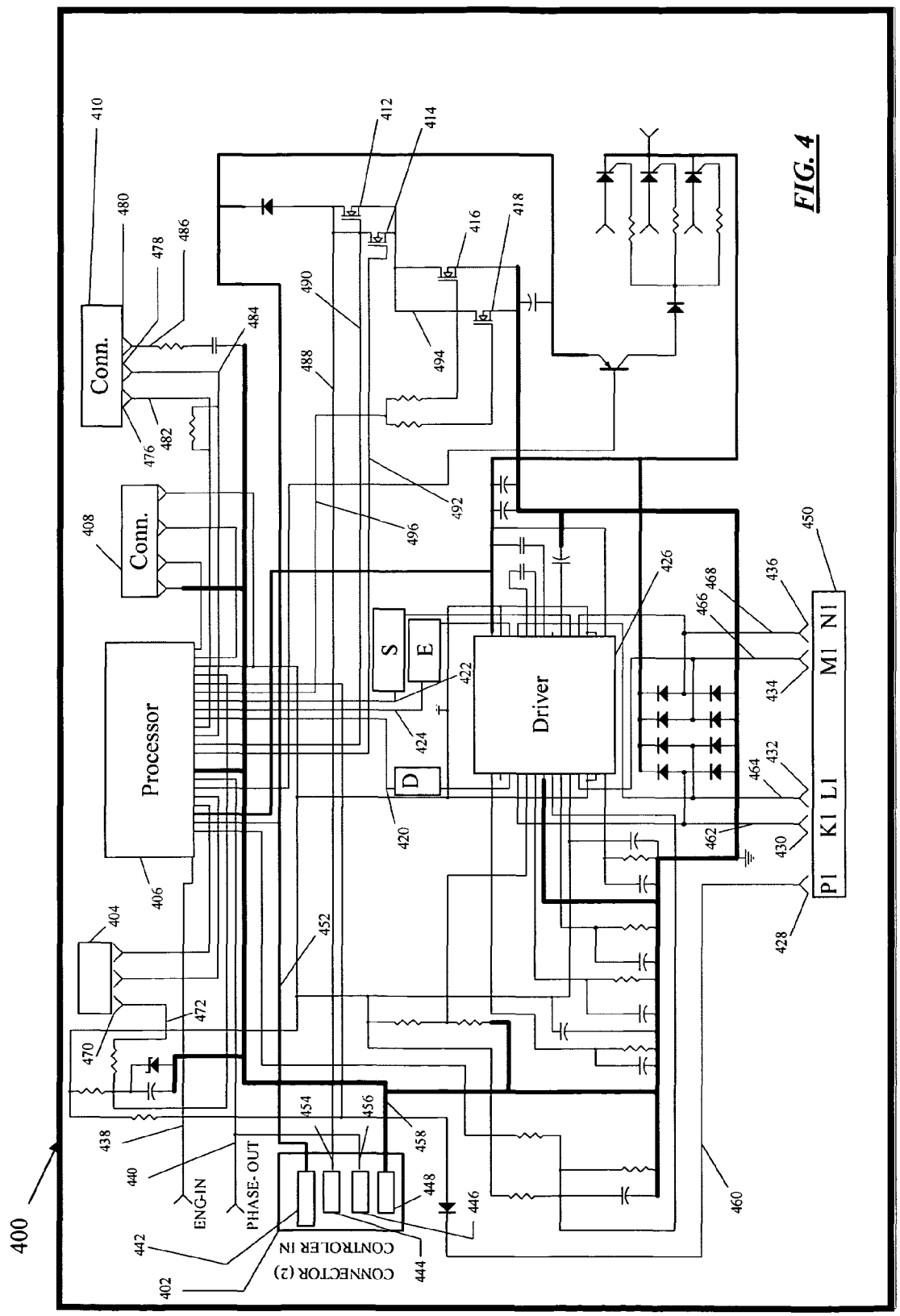
FIG. 4 is a schematic diagram of a preferred embodiment of a control device included in the power control system of FIG. 1, FIG. 2, or FIG. 3.

FIG. 4 depicts a schematic diagram of a preferred embodiment of a control device 400 as an electrical circuit. In this embodiment, the control device comprises a processor 406. The processor 406 preferably comprises a microprocessor, a processor clock, and a power supply. In one preferred embodiment, the microprocessor is a 68C08 processor having internal flash memory available from Motorola, Inc. of Schaumburg, Ill. The internal clock may be a crystal-type oscillator or other oscillator mechanism known to those practiced in the art, and the power supply may be a discrete or integrated circuit configured to supply the processor 406 with appropriate DC voltage. It is contemplated that the processor may be a combination of individual discrete or separate integrated circuits packaged in a single housing or it may be fabricated in a single integrated circuit.

The processor 406 is connected to and in communication with a generator (not shown) via a connector 402. The processor 406 is further connected to and in communication with a prime mover and a transmission (not shown) via a connector 450. In one preferred embodiment, the control device 400 further comprises a driver 426 which is used as an interface between the processor 406 and the prime mover. It is contemplated that in other embodiments, the driver 426 is an integral part of the prime mover and more specifically, a part of the prime mover controller. The processor 406 is further connected to and in communication with MOSFETS 412, 414, 416, and 418 wherein the processor 406 may regulate an output voltage of the generator at a regulation voltage. It should be clear to a skilled artisan that a single MOSFET or any similar transistor can be implemented to regulate the voltage. The processor 406 is further connected to and in communication with a temperature sensor and an I/O port via connectors 404 and 410, respectively.

In one embodiment, the connector 402 comprises four separate terminals, namely an ALT terminal 442, an F-terminal 444, an AC terminal 446, and a GND terminal 448. Preferably, the ALT terminal 442 is used to couple to an output terminal of the generator via a line 452, the F-terminal 444 is used to couple with an output power controller (indicator) of the generator, for instance, a field coil via a line 454, the AC terminal 446 is used to couple with a phase terminal of the generator via a line 456, and the GND terminal 448 is used to couple with a ground terminal via a line 458, providing a return path for the current flow. Preferably, the processor 406 utilizes: (1) the ALT terminal 442 to measure an output voltage of the generator, (2) the F-terminal 444 to ascertain a power level of the generator by, for instance, measuring a duty cycle of the output power controller of the generator, (3) the AC terminal 446 to provide access, for instance, to an RPM of the generator, via the phase-out terminal 440, and (4) the GND terminal 448 to access a ground terminal.

In one embodiment, the connector 450 is utilized to connect to and communicate with the prime mover controller and transmission. Preferably, the K1 terminal 430, L1 terminal 432, M1 terminal 434, and N1 terminal 436 are utilized to couple with the prime mover controller via lines 462, 464, 466, and 468, respectively, and P1 terminal 428 is utilized to couple with the transmission via a line 460. Preferably, the processor 406 utilizes the driver 426 to connect to and communicate with the prime mover controller via the lines 462, 464, 466, and 468. The processor 406 interfaces with the driver via lines 420, 422, and 424.

In one embodiment, the prime mover is an internal combustion engine and the prime mover controller comprises an electric actuator that is coupled with a throttle of the engine via a mechanical cable. Preferably, the processor 406 utilizes: (1) the line 424 to enable the actuator, (2) the line 420 to communicate a direction of movement of the cable to the actuator, and (3) the line 426 to communicate a step of movement of the cable to the actuator. In a variation of the present embodiment, a single line may be utilized to communicate the enable, direction, and step by transmitting a data frame to the driver. In yet another variation, a wireless communication device imbedded in the processor and the driver may be utilized to perform the same task.

In one embodiment, the processor 406 connects to and communicates with MOSFETS 412, 414, 416, and 418, via lines 488, 490, 492, 494, 496, and 458. Preferably, MOSFETS 412 and 414 are coupled in a parallel configuration, known to skilled artisans, and are utilized to regulate an output voltage of the generator at a regulation voltage, for instance 28 V, and MOSFETS 416 and 418 are also coupled in a parallel configuration, known to skilled artisans, and are utilized to protect the generator from excessive voltage, for instance, 30 V a condition commonly referred to as an over voltage cut off (OVCO) condition. Other transistors instead of the MOSFETS may be utilized to perform the same task as known by skilled artisans Furthermore, it should be clear to a skilled artisan that a single transistor can be used to regulate the voltage and that multiple transistors are used here to provide redundant and OVCO protection.

In one embodiment, the processor 406 connects to and communicates with a temperature sensor (not shown) via a terminal 470 of the connector 404. Preferably, the processor 406 utilizes a line 472 to measure a temperature, for instance an ambient temperature, to compensate the regulation voltage accordingly. In another embodiment, the processor 406 connects to and communicates with a computer system via a CAN-L terminal 476, CAN-H terminal 478, and GND terminal 480 of the connector 410. Preferably, the processor 406 utilizes lines 482, 484, and 486 to transmit/receive system information. In one variation of the present embodiment, the processor 406 utilizes a CAN Protocol to exchange system information.

Utilizing the system 100 described in FIG. 1, one embodiment of the operation of the control device 110 is now described. The generator 102 is a permanent magnet alternator having an SCR as an output power controller 104 (or a generator output power indicator as discussed above) and the prime mover 106 is an internal combustion engine. The prime mover controller 108 comprises a stepper motor coupled with a throttle of the engine via a mechanical cable. The control device 110 ascertains a power level of the alternator and varies an output power of the engine according to the power level. This embodiment may readily be implemented in a generator set available from Goodman Ball, Inc. of Menlo Park, Calif.

In one situation, the control device 110 measures a voltage variation from a signal received via the line 112. The processor 406, included in the control device 110, determines a duty cycle of the voltage variation, utilizing an onboard programming code stored in the memory of the processor 406. This duty cycle is compared with a pre-determined range, for instance between 30% and 60%. If the determined duty cycle is outside of the pre-determined range, the processor 406 generates a signal to the driver 426 that includes an enable, direction, and step components which enable the stepper motor to move the mechanical cable a certain amount in a particular direction, thereby manipulating the throttle plate of the throttle. For instance, if the duty cycle is 20%, the processor 406 enables the stepper motor, and moves the mechanical cable to partially close the throttle plate. This causes the engine RPM to decrease which in turn causes the engine output power to decrease. In another instance, if the duty cycle is 65%, the processor 406 enables the stepper motor, and moves the mechanical cable enough to partially open the throttle plate, causing the engine RPM to increase, which in turn causes the output power of the engine to increase. If the duty cycle is within the pre-determined range, the processor 406 generates a signal whose step component equals a value of zero, causing no change to the condition of the stepper motor.

Utilizing the system 200 described in FIG. 2, one embodiment of the operation of the control device 206 is now described. The generator 102 is a brushless alternator having a field coil as an output power controller 104 (or a generator output power indicator as discussed above), available from C.E. Niehoff & Co. of Evanston, Ill. The prime mover 106 is an internal combustion engine and the prime mover controller 108 is a stepper motor coupled with a throttle of the engine via a mechanical cable. The transmission 208 is engaged via a transmission control module (not shown but known to skilled artisans). The control device 206 ascertains a power level of the alternator and varies an output power of the engine according to the power level when the transmission control module is set to either a neutral or parked position. This embodiment may readily be implemented in a motor vehicle.

In one situation, the system 200 is utilized to power and propel the vehicle, utilizing the engine and transmission, and provide electrical power to the vehicle accessories, represented by the variable load 126, utilizing the alternator. The control device 206 monitors a signal via the line 210 to determine the state of the transmission. When the vehicle operator sets said state to either neutral or parked, the control device commences to control the output power of the engine. In a configuration, as described above, the control device 206 utilizes a processor 406 and MOSFETS 412 thru 418 to also regulate the output voltage of the alternator. The line 112 is utilized to switch on/off the field coil to maintain the output voltage of the alternator, as sensed via the line 128, at a regulation voltage, for instance 14 V. The processor 406, utilizing an onboard programmable code stored in a memory of the processor 406, also measure a duty cycle of the voltage variation across the field coil produced by said on/off switch-ing. The processor 406 generates a signal to the driver 426 to manipulate the throttle of the engine so that the duty cycle remains substantially within a pre-determined range. In another instance, the programmable code may include a pulse width modulation code, as described in Jabaji, U.S. Pat. No. 5,907,233, wherein the processor 406 selects one of several duty cycles and concurrently manipulates the throttle to maintain the regulated output voltage of the alternator. In another instance, the processor 406 is further configured to disengage the prime mover controller 108 when the duty cycle is below a pre-determined level, for example 28%.

Utilizing the system 300 described in FIG. 3, one embodiment of the operation of the control device 310 is now described. The generator 102 is a brushless alternator having a field coil as an output power controller 104 (or a generator output power indicator as discussed above). The prime mover 308 is a turbine engine. The output speed converter 314 is a power train that is coupled with the engine and the alternator. The power train operates to convert a rotational speed of the turbine output shaft. The control device 310 ascertains a power level of the alternator and converts the rotational speed of the engine, via the output speed converter 314, according to the power level. This embodiment may readily be implemented in an aircraft.

In one situation, the control device 310, implementing a processor 406 and MOSFETS 412 thru 418, regulates the output voltage of the alternator and determines a duty cycle of the field coil, via the line 112. The control device 310 compares the duty cycle to a pre-determined range and generates a signal to the power train, via the line 312, to engage a gear of the power train so that the duty cycle remains within the pre-determined range.

Figure 5:
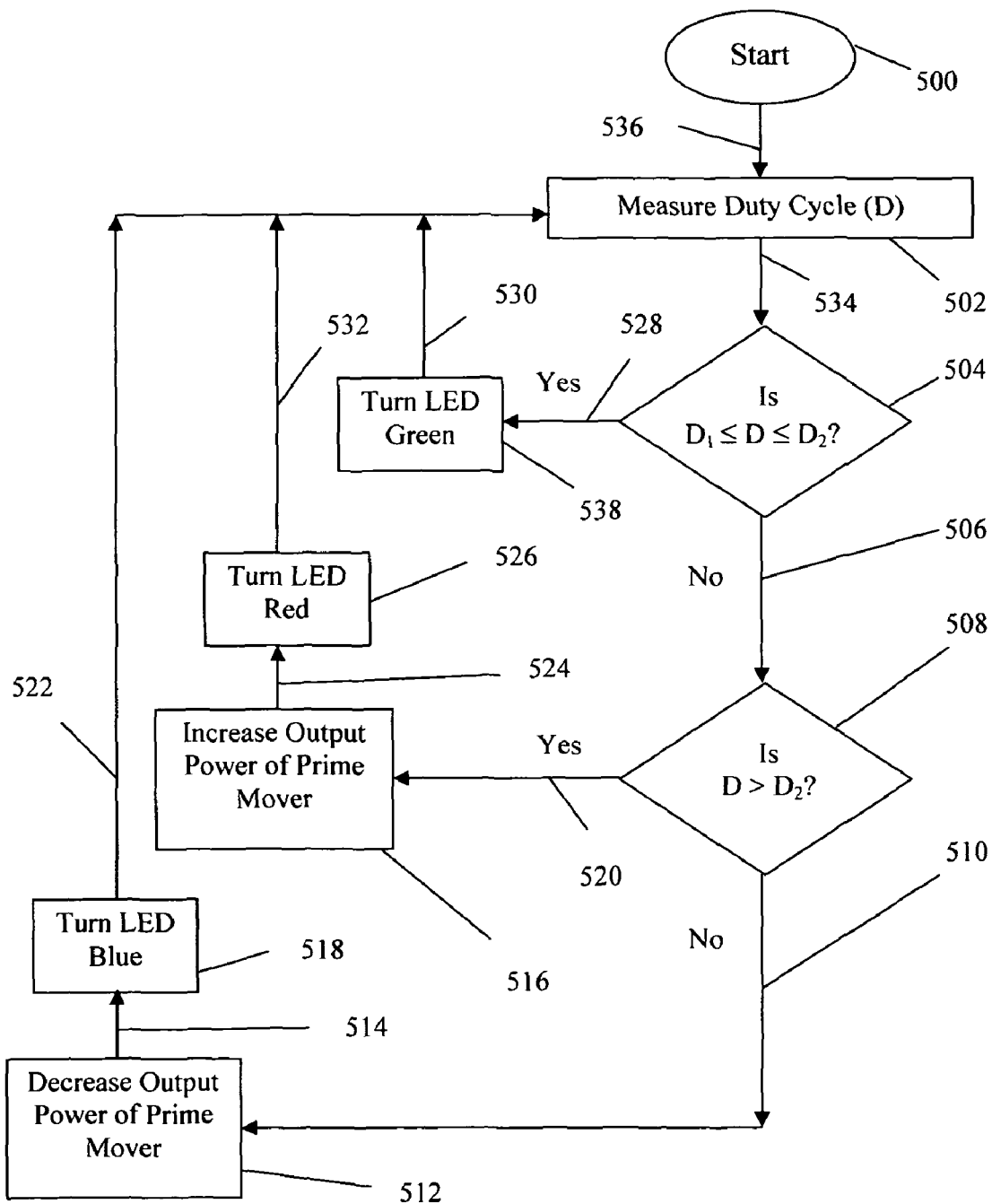
FIG. 5 is a flow diagram of one preferred method of operation of the power control system of FIG. 1, FIG. 2, or FIG. 3.

FIG. 5 illustrates an example of one method of operating the control device 110, utilizing FIGS. 1 and 4. Upon power up at 500, the processor 406 measures a duty cycle, at 502, of the generator output power controller 104 (or a generator output power indicator as discussed above) of the generator 102, via the line 112. The duty Cycle (D) is then compared to a lower limit ($D_1$) and an upper limit ($D_2$) at 504. The duty cycles ($D_1$) and ($D_2$) are either pre-programmed in the memory of the processor 406 or they can be interactively programmed into the processor 406 via the I/O port 118. If (D) is greater than or equal to ($D_1$) and less than or equal to ($D_2$), the processor 406 generates a signal at 528 to turn on the LED 116 to a particular color, for instance green, at 538. The processor 406 is branched at 530 to measure the duty cycle (D) at 502. If the duty cycle (D) is not within the range between ($D_1$) and ($D_2$), the processor 406 continues at 506 to compare (D) with ($D_2$) at 508. If (D) is greater than ($D_2$), the processor 406 continues at 520 to generate a signal to the prime mover controller 108, via the line 114, to increase the output power of the prime mover 106, at 516. The processor 406 then generates a signal at 524 to turn the LED 116 to a red color at 526. The processor 406 is branched at 532 to measure the duty cycle (D) at 502. If (D) is less than ($D_1$), the processor 406 continues at 510 to generate a signal to the prime mover controller 108, via the line 114, to decrease the output power of the prime mover 106, at 512. The processor 406 then generates a signal at 514 to turn the LED 116 to a blue color at 518. The processor 406 is branched at 522 to measure the duty cycle (D) at 502.

Figure 6:
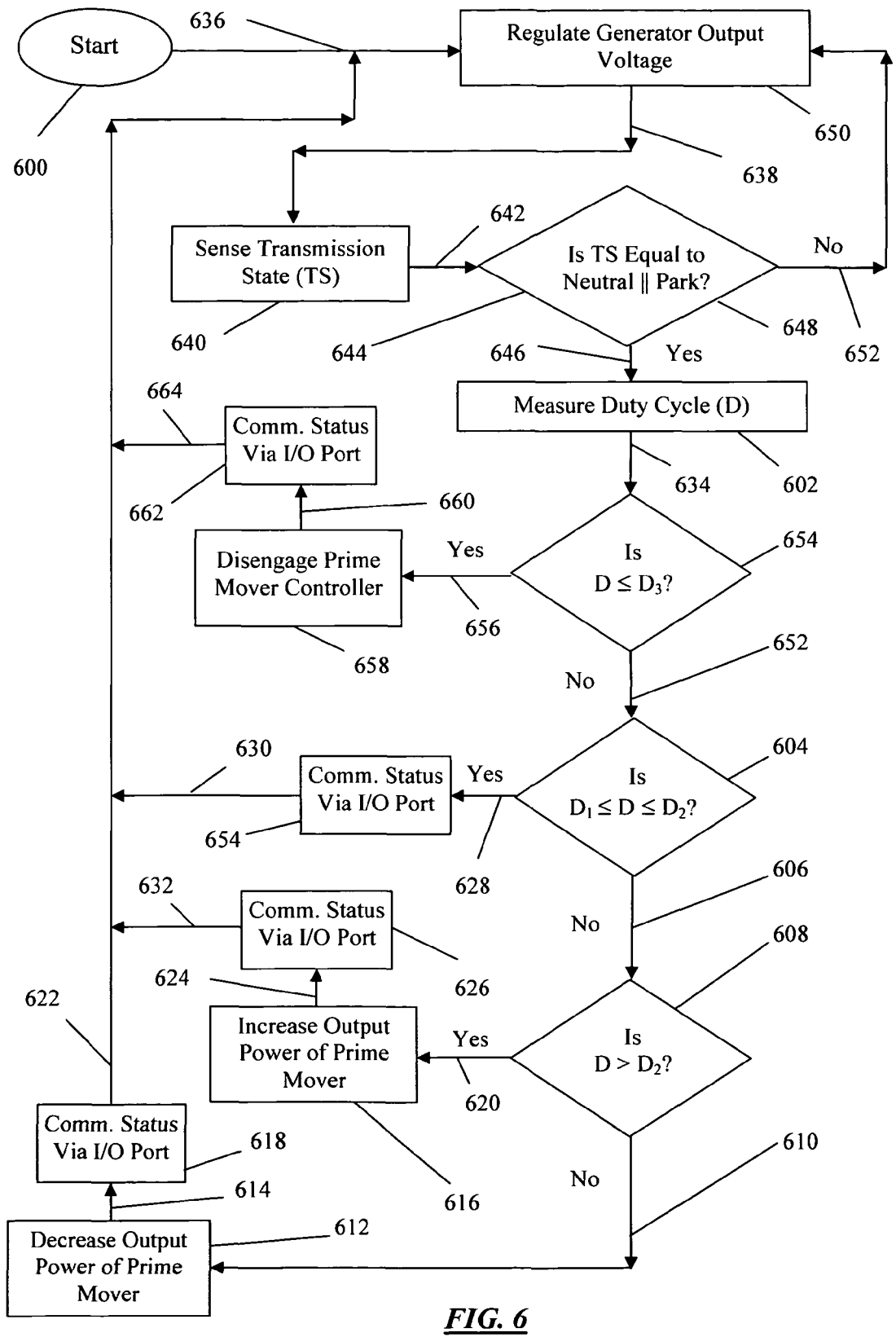
FIG. 6 is a flow diagram of one preferred method of operation of the power control system of FIG. 1, FIG. 2, or FIG. 3.

FIG. 6 illustrates an example of one method of operating the control device 206, utilizing FIGS. 2 and 4. Upon power up at 600, the processor 406 commences to regulate the output voltage of the generator 102, at 650, by controlling the generator output power controller 104, utilizing one or more transistors such as MOSFETS 412 thru 418. The processor 406 concurrently senses a transmission state (TS) at 640 of the transmission 208, via the line 210. If TS is not equal to either a neutral or park state, the processor 406 branches at 652 to regulate the generator output voltage at 640. It should be clear to a skilled artisan that the program included in the processor 406 may operate to regulate the generator output voltage concurrently with controlling the output power of the prime mover 106 according to a power level of the generator 102. It should also be clear to a skilled artisan that the program may operate to determine a duty cycle (D) of the generator output power controller 104 concurrently with regulating the output voltage of the generator 102, or selecting a pre-determined duty cycle (D) utilizing a pulse width modulation scheme as discussed above.

If TS is equal to either a neutral or park state, the processor 406 continues at 634 to compare (D) to a pre-determined value ($D_3$) of the duty cycle. If (D) is less than or equal to ($D_3$), the processor 406 generates a signal at 656 to the prime mover controller 108, via the line 114, to disengage the prime mover controller 108 at 658. The processor 406 then generates a signal at 660 to communicate one or more system status via the I/O port 118, at 662. The processor 406 is branched at 664 to regulate the generator output power voltage at 650. If (D) is not less than or equal to ($D_3$), the processor 406 continues at 652 to compare (D) to a lower and upper limit duty cycles ($D_1$) and ($D_2$), at 604. If (D) is greater than or equal to ($D_1$) and less than or equal to ($D_2$), the processor 406 generates a signal at 628 to communicate one or more system status via the I/O port 118, at 654. The processor 406 is branched at 630 to regulate the generator output power voltage at 650. If the duty cycle (D) is not within the range between ($D_1$) and ($D_2$), the processor 406 continues at 606 to compare (D) with ($D_2$) at 608. If (D) is greater than ($D_2$), the processor 406 continues at 620 to generate a signal to the prime mover controller 108, via the line 114, to increase the output power of the prime mover 106, at 616. The processor 406 then generates a signal at 624 to communicate one or more system status via the I/O port 118, at 626. The processor 406 is branched at 632 to regulate the generator output power voltage at 650. If (D) is less than ($D_1$), the processor 406 continues at 610 to generate a signal to the prime mover controller 108, via the line 114, to decrease the output power of the prime mover 106, at 612. The processor 406 then generates a signal at 614 to communicate one or more system status via the I/O port 118, at 618. The processor 406 is branched at 622 to regulate the generator output power voltage at 650.

Figure 7:
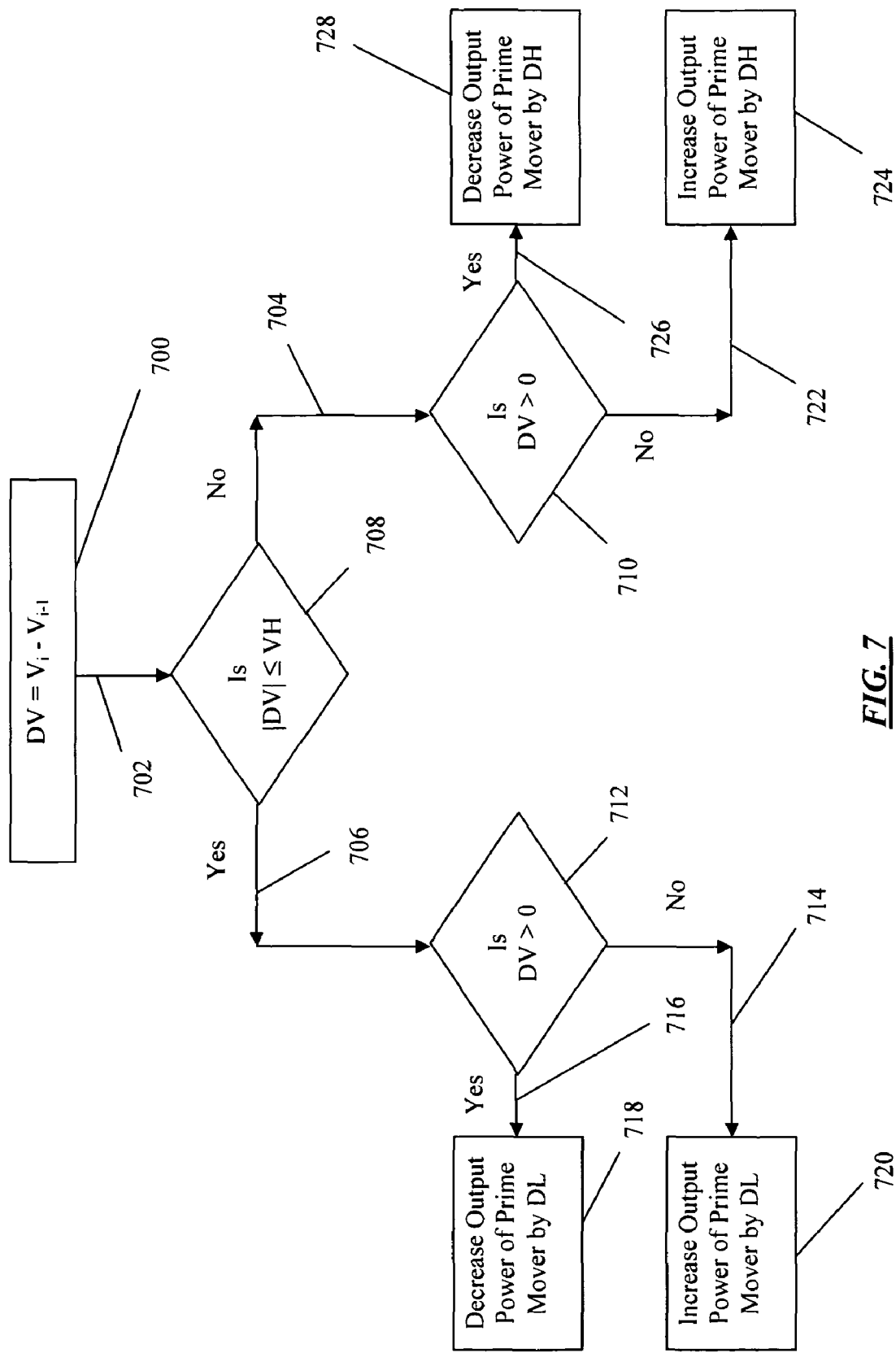
FIG. 7 is a flow diagram of one preferred method of varying an output power of a prime mover included in the power control system of FIG. 1 or FIG. 2.

FIG. 7 illustrates an example of one method of varying an output power of a prime mover 106 by the control device 206, utilizing FIGS. 2 and 4. As discussed above, the control device 206 ascertains a power level of the generator 102 by measuring a duty cycle of the generator output power controller 104 (or a generator output power indicator as discussed above), via the line 112. A preferred method of measuring the duty cycle is by sensing a voltage level of the generator output power controller (V). A program included in the processor 406 operates to vary the prime mover output power according to the measured voltage (V) by comparing it to a pre-programmed value (VH). Two consecutive voltage values ($V_i$) and ($V_{i-1}$) are measured and a difference (DV) is determined at 700. The absolute value of the difference (DV) is compared to (VH) at 708.

If the absolute value of (DV) is less than or equal to (VH) the output power of the prime mover is changed by an amount (DL). In this situation, the sign of (DV) is determined at 712, and if (DV) is greater than zero, the processor 406 generates a signal at 716 to decrease the output power of the prime mover by (DL) at 718. If (DV) is less than or equal to zero, the processor 406 generates a signal at 714 to increase the output power of the prime mover by (DL) at 720.

If the absolute value of (DV) is greater than (VH) the output power of the prime mover is changed by an amount (DH). In this situation, the sign of (DV) is determined at 710, and if (DV) is greater than zero, the processor 406 generates a signal at 726 to decrease the output power of the prime mover by (DH) at 728. If (DV) is less than or equal to zero, the processor 406 generates a signal at 722 to increase the output power of the prime mover by (DH) at 724. The (VH), (DL), and (DH) values may be interactively programmed into the processor 406 via the I/O port 118.

The forgoing discloses a power control system comprising a control device, a prime mover, and a generator. The prime mover drives the generator and the control device ascertains a power level of the generator and varies an output power of the prime mover according to the power level. The system may include a transmission where the control device operation is conditioned on whether the transmission is in a particular state. The system may include a speed converter coupled with the prime mover wherein the control device operates to convert a speed of the prime mover according to the power level. The control device may also operate to control an output power of the generator, for instance, operate to regulate an output voltage of the generator.

The examples and illustrations have been used to assist the reader with understanding this invention and not intended to limit the scope of it. It is the following claims, including all equivalents, which are intended to define the scope of this invention.

What is claimed is:

1. A control device for a generator comprising a generator output power indicator, said generator is driven by a prime mover, said prime mover coupled with a prime mover controller capable of manipulating an output power of the prime mover, said control device comprising:
    a processor, including a programming code operable on the processor, coupled with the generator output power indicator and the prime mover controller;
    wherein said processor is configured to measure a duty cycle of the generator output power indicator, via a first line, and to vary the output power of the prime mover by generating a signal to the prime mover controller, via a second line, according to said duty cycle.

2. The control device of claim 1, wherein said generator output power indicator comprises a terminal capable of providing a signal indicative of the generator output power.

3. The control device of claim 1, wherein the processor is configured to generate a signal, via the second line, to vary the output power of the prime mover so that the duty cycle remains substantially within a pre-determined range.

4. The control device of claim 3, wherein the pre-determined range is substantially between 40% and 100%.

5. The control device of claim 1, wherein the processor is further configured to measure an output voltage of the generator, via a third line, and to generate a signal, via the second line, to vary the output power of the prime mover substantially proportional to a difference between the output voltage and a pre-determined voltage.

6. The control device of claim 1, wherein said processor is further coupled with an output power controller of said generator, via a third line, and wherein the processor is further configured to measure an output voltage of the generator, via a fourth line, and to vary the duty cycle of the generator output power controller, via the third line, so that the output voltage is substantially equal to a regulation voltage.

7. The control device of claim 6, wherein the processor is further configured to measure a temperature of at least one of battery, ambient air, generator, conductor, coolant, and output terminal, via a fifth line, and to vary the regulation voltage according to the temperature.

8. The control device of claim 6, wherein said generator output power controller comprises at least one of a field coil, a silicon controlled rectifier, and a metal oxide semiconductor field effect transistor.

9. The control device of claim 1, wherein the prime mover further comprises a transmission and wherein the processor is further configured to measure a transmission state, via a third line, and to generate a signal to vary the output power of the prime mover when said transmission state is substantially equivalent to at least one of a neutral and parked condition.

10. The control device of claim 9, wherein the processor is further configured to generate a signal, via the second line, to disengage the prime mover controller when the duty cycle is substantially below a pre-determined value.

11. The control device of claim 10, wherein the pre-determined value is substantially equal to 28%.

12. The control device of claim 1, wherein the generator comprises at least one of a brushless alternator, a field control alternator, and a permanent magnet alternator.

13. The control device of claim 1, wherein the prime mover controller comprises a pressure controller capable of varying a pressure of the prime mover and wherein the output power of the prime mover is varied by varying the pressure.

14. The control device of claim 13, wherein the pressure controller comprises a pressure adjustor responsive to the control device and operative to vary the pressure in proportion to said duty cycle.

15. The control device of claim 14, wherein the pressure adjustor comprises at least one of a compressor, a hydraulic pump, a pneumatic pump, and an electric pump.

16. The control device of claim 1, wherein the prime mover controller comprises a fuel volume controller capable of varying a fuel volume of the prime mover and wherein the output power of the prime mover is varied by varying the fuel volume.

17. The control device of claim 16, wherein the fuel volume controller comprises a fuel volume adjustor responsive to the control device and operative to vary the fuel volume in proportion to said duty cycle.

18. The control device of claim 17, wherein the fuel volume adjustor comprises at least one of a carburetor system, a fuel injection system, a throttle, and a fuel volume control system.

19. The control device of claim 1, wherein the prime mover controller comprises a rotational speed controller capable of varying a rotational speed of the prime mover and wherein the output power of the prime mover is varied by varying the rotational speed.

20. The control device of claim 19, wherein the rotational speed controller comprises an actuator responsive to the control device and operative to vary the rotational speed in proportion to said duty cycle.

21. The control device of claim 20, wherein the actuator comprises at least one of an electric actuator, a pneumatic actuator, and a hydraulic actuator.

22. The control device of claim 19, wherein the rotational speed controller comprises a fuel distributor responsive to the control device and operative to vary the rotational speed in proportion to said duty cycle.

23. The control device of claim 22, wherein the fuel distributor comprises at least one of a throttle, a fuel injection system, and a carburetor system.

24. The control device of claim 1, wherein the prime mover controller comprises an electronic engine controller capable of varying a rotational speed of the prime mover and wherein the output power of the prime mover is varied by varying the rotational speed.

25. The control device of claim 1, wherein the prime mover controller comprises an electronic engine controller capable of varying a fuel volume of the prime mover and wherein the output power of the prime mover is varied by varying the fuel volume.

26. The control device of claim 1, further comprising means for communicating system information.

27. The control device of claim 26, wherein said system information comprises at least one of a prime mover output power, a prime mover rotational speed, a prime mover pressure, a prime mover fuel volume, a generator power level, a generator regulation voltage, a generator output controller duty cycle, a temperature, and a transmission state.

28. The control device of claim 26, wherein said communication means comprises a communication terminal, coupled with a computer system, capable of transmitting/receiving a communication signal indicative of said system information.

29. The control device of claim 26, wherein said communication means comprises a light emitting diode, generating a flashing light pattern indicative of said system information.

30. A control device for a generator comprising a generator output power controller, said generator is driven by a prime mover via a speed converter coupled with the prime mover and capable of converting a speed of the prime mover, said control device comprising:
  a processor, including a programming code operable on the processor, coupled with the generator output power controller and the speed converter;
  wherein said processor is configured to measure a duty cycle of the generator output power controller, via a first line, and to convert the speed of the prime mover by generating a signal to the speed converter, via a second line, according to said duty cycle.

31. The control device of claim 30, wherein the speed converter comprises a power train.

* * * * *